United States Patent Office 2,760,040
Patented Aug. 21, 1956

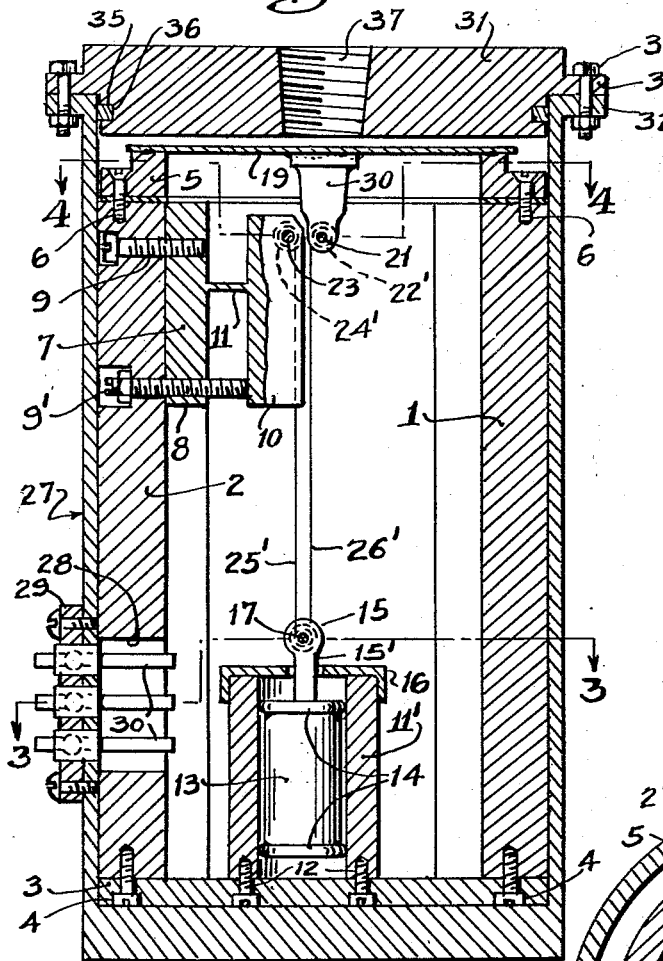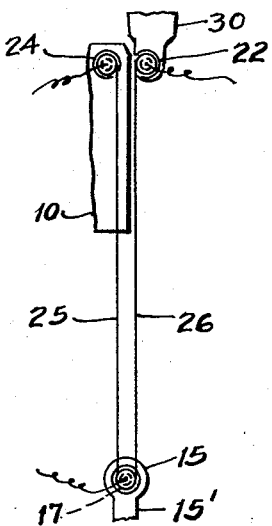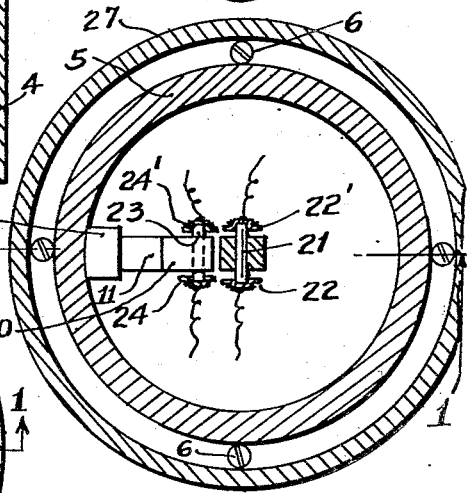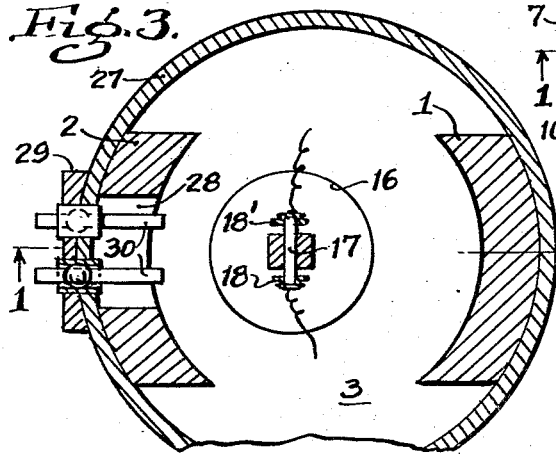
INVENTOR
LOUIS D. STATHAM
BY Philip Subkow
ATTORNEY.

2,760,040

ELECTRICAL STRAIN WIRE TRANSDUCER

Louis D. Statham, Beverly Hills, Calif., assignor to Statham Laboratories, Inc., Los Angeles, Calif., a corporation of California Application April 20, 1955, Serial No. 502,690

18 Claims. (Cl. 201—63)

This invention relates to an electrical strain wire transducer. Transducers in which a force summing means varies the tensile stress on the wire to cause a variation in the electrical resistance of the wire which is thus a measure of the motion of or of a force imposed on a force summing means are well known. The force summing means may be a rod, diaphragm, or weight, or any other member subject to motion in space as a result of forces or motions imposed thereon. The force summing means is the medium for summing up all the forces simultaneously applied to the force summing means and transmitting the same to the wire. When the force summing means is a rod, the transducer may be a displacement measuring device; or, where the force summing means is a diaphragm, the transducer may be a pressure gauge; and, where the force summing means is a weight, it may be a velometer, accelerometer, or velocitometer, as the case may be. The foregoing is intended as illustrative and not as exhaustive of the forms of force summing means and of the applications of strain wire transducers.

Such strain wire gauges are of two general types. In one of the types, the wires are connected by one end to a fixed point, and the other end of the wire to the force summing means. In another type, wire supports are subject to motion with respect to each other, and none of the wire supports are connected to a fixed point.

In both of these forms, the nature of the winding configuration in the strain wire transducer determines whether the electrical circuit, in which the wires are connected for purpose of detecting or measuring their variation in electrical resistance, contains filaments which vary in tension all in one direction, or whether this winding includes wires whose tensions vary in opposite directions upon a displacement of the force summing means, when the electrical circuit is in the form of a bridge, as is usual. The electrical output of the bridge, i. e., the total variation in resistance, and therefore, the voltage output per unit of voltage input to this bridge is twice as great in the second instance as in the first instance. The second type of winding is preferred.

In the conventional strain wire gauge in which one end of the wire is connected to the force summing means and the other end of the wire is connected to a fixed point, it is necessary to limit the motion of the force summing means so that it does not cause a strain in the wire such that the stress exceeds the elastic limit of the wire. For wires of steel or constantan, which are most generally used in this art, such strain wire transducers are designed to limit the total strain to be produced in the wires to be not greater than 0.0015 in./in. in a zero centered instrument (i. e., with an initial strain of 0.0015 inch per inch and a total maximum strain of 0.003 inch per inch). The corresponding stress is far below the actual elastic limit of the wire, and this limit of strain is used in order to introduce a safety factor of about 1.3 to 1.5, depending on the wire employed and other practical considerations. Even when employing a permissible total strain of 0.003 in./in., it is the practice, particularly in small gauges such as the so-called subminiature gauges now commercially sold, to set stops to limit the motion of the force summing means so that the wire is stretched only eighty per cent of the permissible additional extension set by the factor of 0.0015 in./in. This factor of safety is necessary because the stops which are used cannot be set with an accuracy which will permit the strain to create a stress which would be up to but not beyond the elastic limit, and also because the stops cannot be considered absolutely rigidly defined surfaces.

Stops are usually set screws having a given modulus of elasticity; and the force summing means and the framework in which the transducer is mounted are also elastic members, i. e., the metal itself has elasticity. Consequently, an inaccuracy is introduced equal to the sum of the above elastic effects. The wire may thus be strained an amount greater than that which is determined by the position of theoretically rigid stops set at the limits previously referred to. For example, if steel having a modulus of elasticity of 30 million pounds per square inch (p. s. i.) were used in the frames and stops, 100 p. s. i. of force against the stops would give a deflection of 3.33 microinches/in. due to the elastic effects discussed above. If the stops and frame of the transducer were made of constantan, assuming a modulus of about 20 million p. s. i., the deflection due to elastic effects of a pressure of 100 p. s. i. would be equivalent to 5.0 microinches per inch, or considerably more than the deflection for steel.

In a transducer having strain wire with a length of one inch, set with an initial strain of 0.0015 inch per inch with stops set to permit an additional strain of .0015 inch per inch, the resultant elastic deformation at the stops could result in a strain in the wire in excess of the above figure. In order to avoid this, the stops are set so that the elastic deformation of the gauge, when added to that of the wire, does not result in a strain on the wire in excess of the safe limit described above. As a result of these considerations, the present practice is to set the stops at eighty per cent of the maximum permissible deflection, using the factor of 0.0015 in./in. of wire, so that the gauges are over-designed with a factor of safety of 1.25, which is superimposed upon the generous factor of safety implied by using 0.0015 in./in., or a total factor of safety of above 1.6 to about 2. Consequently, the wires in the present design are employed far below the capacity to produce electrical output in an optimum design for an electrical bridge circuit.

Another difficulty present in the prior art designs results from the elasticity of the metal employed in the transducer. As the force summing means approaches the stop and exerts a force against the stop, the motion of the force summing means no longer produces the same changes in stress in the wire per unit of movement of the force summing means as it did during the approach to the stops, i. e., the proportionality of strain exerted in the wire to the force exerted on the force summing means will not be the same after the force summing starts to stress the stops, and is in fact less than during the approach to the stops. This is a result in the compressibility of the transducer frame and stops described above. Consequently, during this latter portion of the motion of the force summing means, the variation in strain in the wire is a non-linear function of the movement of the force summing means. Therefore, in order to obtain a unit with true linearity, the instrument must be used in the range below that to which the instrument could theoretically respond.

As a result of all these factors, the instrument designed employing stops must be made oversize for the service for which it is designed.

It is one of the objects of my invention to design a variable electrical resistance strain wire transducer which can obtain essentially the maximum available safe total strain from a wire of given length without exceeding the safe strain, and could be strained to the above gauge limits with true linearity of the relationship of the strain in the safe operating range.

It is another object of my invention to design a strain wire transducer of high natural frequency by limiting the mass added to the force summing means to a minimum amount, while, at the same time, employing a four-arm bridge.

In my previous applications, Serial Nos. 354,294 filed May 11, 1953, and No. 354,295 filed May 11, 1953, and Patent No. 2,455,883 issued December 7, 1948, I have developed instruments having a high natural frequency by reducing the mass of the transducer which is attached to the force summing means, and I have obtained that result by attaching a strain wire to the force summing means and to a fixed point, so that the mass which is added to the force summing means results from the attachment of the wire to the force summing means and from the mass of the wire itself. Such transducers had the advantage that they eliminated armatures, linkage pins, and other mechanical connecting means. It was, however, not possible in such designs to devise a four-arm bridge without doubling the length of the transducer.

It is a further object of my invention to modify the above design in order to produce an electrical strain wire transducer in which the wires may be connected as a four-arm bridge to obtain a transducer having a small mass and high natural frequency without increasing the size of the transducer. Or, conversely, if one is satisfied with the electrical output of the two-arm bridge, the same electrical output can be obtained by a transducer of substantially half the length of the transducers described above.

Since, as a practical matter, the transducers are mounted in a rigid case, or other member, the variations in temperature introduce a variable in the operation in the point of the differential expansion between the wire of the transducer, the frame on which the wire is mounted, the force summing means, the case, and other elements of the construction. This results in a stressing of the wires even though no force is imposed on the force summing means. The zero point of the gauge thus shifts with changes in temperature.

In the transducers of my invention, I introduce a compensating mechanism whereby the effect of the differential expansion may be minimized and substantially suppressed.

The above and other objects of my invention are realized in an electrical strain wire gauge forming the instant invention, which is in the form of a transducer consisting of a force summing member, a strain sensitive filament composed of two filamentary elements, one of the elements being attached to the force summing member, extending therefrom to a first point of attachment, and the other of the elements extending from the first point of attachment to a second point of attachment, in such manner that the first point maintains a tension on each of the elements, and the variation in tension of the element attached to the force summing means responsive to the motion of the force summing means causes a variation in the other of said elements in an opposite direction.

The second point of attachment may be one which is not displaced in space on motion of the force summing means, as for example, it may be fixed rigidly in space by attachment to a fixed point in the case or frame of the transducer.

The magnitude of this change in tension in the wires in the aforementioned forms of the transducers of my invention may be unequal or made to be substantially equal, with a resulting difference in the electrical efficiency of the transducers as will be more fully described below.

In a preferred embodiment of my invention, the first point of attachment is subject to a constraint other than that imposed by the filaments; and it is further desirable, and to be preferred, that the ratio of the constraining force exerted on the movable point to the motion of the first point, which may, for convenience, be referred to as the spring rate of the first point, be less and preferably a small fraction of the spring rate of the wire, i. e., the ratio of the force exerted in tension on the wire to the elongation of the wire thus produced.

In the transducers of my invention, when the second point of attachment is fixed on the frame member of the transducer, when the spring rate of the first point is zero, the forces exerted on the wires are equal and opposite, or move with respect to the end of the wire attached to the force summing means in an algebraically different amount, and the change in tension in one of the elements is equal and opposite in sign to that of the first element, the force transfer from one of the elements to the other of the elements is thus 100%. However, as the spring rate of the first point increases, i. e., becomes stiffer, the force transfer falls from 100% and becomes zero when the first point may be considered to be a rigid point, and the wire extending from the first to the second point becomes entirely inoperative as an active wire of the bridge. I have discovered, however, that by employing a spring rate for the first point less than the spring rate of the wire I can obtain a substantial proportion of the theoretical electrical output of the bridge in the range of above about 75% of the theoretical output and by limiting the spring rate of the first point of attachment in the range of about 0.01 and even about .001 of the spring rate of the wire, I may increase the electrical efficiency of the bridge to more than about 99% of the theoretical efficiency of the bridge.

When I employ a configuration in which the motion of the second point is equal and opposite to the motion of the point of attachment to the force summing means, I may obtain substantially the theoretical electrical output of the bridge irrespective of the spring constant of the first point of attachment. The force transfer from one of the wires to the other of the wires may be substantially 100%.

While the spring constant of the first point of attachment has the above effects on the electrical output of the bridge, it has a separate and important effect in permitting the avoidance of stops to limit the motion of the force summing means.

As described above, the character of the winding of the transducer of my invention, results in a variation in tension in the first wire element connected to the force summing means and to the first point of attachment which is opposite in direction to the consequent variation in tension in the second wire element connected to the first point of attachment and the second point of attachment. Thus, an increase in tension in one of the wires results in a decrease in tension in the other of the wire elements.

If the transfer of force on the wires is substantially 100%, then the wire is not increased in tension by an amount greater than that by which the other wire is relaxed in tension. By winding the wires in equal or unequal tension so that the initial tension on one of the wires when added to the tension on the other of the wire elements of the bridge, does not exceed in total sum the ultimate tensile stress imposable on any of the wires at the safe limit, or the stress at the proportionality limit of the wire, the movement of the force summing means will not stress the wires beyond the design limit thus imposed.

When the transfer is not substantially 100%, by making the spring rate of the first point sufficiently low as compared with the spring rate of the wire, the increase in tension occurring in one of the wires on continued movement of the force summing means after the complete relaxation of the second wire of the bridge, may be such as to cause but an insignificant addition to the total stress on the wires still under tension, and thus as a practical matter, giving effect to the magnitude of the movements encountered in force summing means in practical operations, thus resulting in a total stress on the wire which does not exceed, in any substantial amount, the aforesaid design limit.

The general form of the transducer of my invention comprises a pair, or a plurality of pairs, of like filaments whose electrical resistance is varied by variation in the strain imposed on each of the filaments. The filaments of each pair, wound as previously described, are electrically connected at their ends, and are joined together to a yieldable constraining means. The opposite ends of each of the wires are connected so that at least one of them is connected to a force summing means, and an end of the other of the filaments of the pair of filaments is so attached to a wire support that, upon displacement of the force summing means, the ends of each of the wires move relative to each other, so that the variation in strain imposed on one of the filaments by the force summing means is transferred to the second filament of the pair to cause a variation in strain in the opposite direction.

The tension in the wires of each pair, which change in the same direction on motion of the force summing means, may be made equal.

The differential motion may be attained by attaching one of the wires to a force summing means and the other to a point so rigidly fixed on a frame member, in comparison to the ends attached to the constraining means, as to be deemed to be a point fixed in space.

The second filament, instead of being attached to such a fixed point, may be attached to a means positioned with respect to the frame so that it moves in a direction opposite to the movement of the force summing means, or to give an otherwise differential motion between the force summing means and the first mentioned means.

In either case, a motion of the force summing means, which causes a variation in strain in the filament attached to the force summing means, is accompanied by a variation in strain in the other of said pair of filaments which is in the opposite direction, and also a deflection of the ends of the wires attached to the constraining means.

It is a characteristic of the transducers of my invention that the sign of the variation in strain in the filaments of each pair is opposite, to wit, the tension in one increases while it decreases in the others of the filaments of each pair. The magnitude of the variation is a function of the ratio of the spring constant of the constraining means to the spring constant of the filaments, approaching equality as the spring constant of the constraining means approaches zero.

By spring constant I mean, in the case of the constraining means, the ratio of the force exerted to the deflection of the constraining means, and, in the case of the filaments, the ratio of the stress to the strain.

In the form of the embodiment disclosed herein the yieldable constraining means is a weight.

Such a constraining force may be a weight attached of such magnitude so that it imparts a maximum stretch in each wire which is not in excess of the aforesaid limits. Since the weight, i. e., mass, is a constant irrespective of the displacement of the mass, where acceleration forces may be ignored, the proportionality between the constraining force and the displacement of the mass, which may be visualized as the spring constant of the constraining force of the mass, may be taken mathematically as zero.

$$dF = k\,dx = 0 \qquad \text{(Equation 1)}$$

where $dF$ is the change in the constraining force upon any displacement $dx$ of the constraining means, and $k$ is the spring constant.

The transducers of my invention will be more fully described in connection with the accompanying drawings, of which:

Figure 1 is an irregular section through the form of transducer of my invention, taken on line 1—1 of Fig. 3;

Fig. 2 is a fragmentary view of the wires and their pin mountings;

Fig. 3 is an irregular section taken on line 3—3 of Fig. 1;

Fig. 4 is a section taken on line 4—4 of Fig. 1.

As illustrated in the drawings, a frame, composed of two legs 1 and 2, is mounted on base 3 by means of screws 4. A ring 5 is mounted on the legs 1 and 2 by means of screws 6. On the inner wall of the leg 2 is mounted a spring block 7. A leg 8 is connected to the leg 2 by means of screws 9 and 9'. The leg 10 is connected to the leg 8 by means of the leaf spring 11 milled from the block.

Mounted on base 3 is a hollow cylinder 11' attached to the base 3 by means of screws 12. A cylindrical weight 13 carrying end flanges 14 is positioned in the cylinder 11' from the walls thereof. The end flanges are curved at their peripheral surface, in order to limit the area of contact of the weight with the cylinder 11'. The cylinder may be lubricated to reduce friction.

The weight is connected by a rod 15' to a stem 15 and the rod passes freely through a cap 16 which closes the cylinder.

Mounted on the ring 5 is a diaphragm 19 which closes the opening of the ring and is spot welded at its periphery to the ring 5 to make a fluid-tight joint. A stem 30 is connected to the diaphragm 19.

Insulating pins 17 carrying caps 18 and 18' pass through the stem 15 axially aligned with the axis of the weight 13 and cylinder 11'. A similar pin 21 and cap assembly 22 and 22' is mounted in stem 20, and a similar pin 23 and cap assembly 24 and 24' is mounted in the block 7. All of said pins are insulating pins carrying metallic caps to which the wires may be soldered.

The wire 26 is wound about and soldered to the cap 22, and wire 25 extends to and is wound about and soldered to the cap 24, and both wires 25 and 26 extend in tension to and are soldered to cap 18. An additional pair of wires 25' and 26' is similarly wound about and mounted on caps 18', and caps 22' and 24'. Instead of single wires it may employ wire loops.

The axis of the pin 21, which is on the axis of the weight 13 and cylinder 11', is in the plane which bisects the angles made between wires 25 and 26, and also between the similar pair 25' and 26', whose geometry is the same as that of wires 25 and 26. All of the wires may be made of the same length and equal in tension, each less than one-half of the tension at the design limit, as described previously. The tension in the wires of each pair may be unequal, with the sum of the tensions of the wires of each pair equal to that of the other pair and less than the design limit, as described above, the tensions in the wires 25 and 25' being equal, and the tensions in wires 26 and 26' being equal.

The pins are so spaced, the diameter of the caps are so chosen, and the points of attachment of the wires are so selected as to give the desired value to the included angle.

With the frame in vertical position the weight 13 is thus supported on the four wires 25, 26, 25' and 26' via rod 15'. The resulting tension on wires 26 and 26' may be equal to or greater than that in 25 and 25' depending on the adjustment of the set screw 9'. By adjustment of the screw 9' the pin 23 may be moved clockwise or counter-clockwise about the flexure point in spring 11, and thus the ratios of the stresses in 25 and 26, and also in 25' and 26', may be adjusted without introducing any moment in the weight 13 due to the suspension of the weight on the rod 15'. The weight is thus suspended in the cylinder 11' with all external surfaces of the weight free of the walls of the cylinder 11'. The cylinder is thus axially displaced from the center line of the stem 20 for this purpose.

While the included angle between the wires 25 and 26 and between 25' and 26' may be varied from parallelism of the wires to less than 180°, I prefer to make the wires 25 and 26 as close to parallel as is mechanically feasible. The wires or wire loops 25 and 26, and also 25' and 26', are wound so that the axes of the wires are coplanar. The tensions in the wires of each pair of wires may thus be initially adjusted, i. e., either equal or unequal, with the sum of the tensions of the wires in each pair not in excess, and preferably less than the design limit so that a decrease in tension of one of the wires would not cause the companion wire to be stressed beyond the design limit.

The pin 23 may be considered fixed in space, since due not only to the comparatively high value of the spring constant of the flexure 11 but also because of the back-up of the set screw, which may be made sufficiently rigid, so that the variation in tension in the wires will cause no substantial deflection of the flexure 11.

The frame is mounted in the case 27, provided with a bore 28 covered with a terminal plate 29 carrying four insulated terminals 30 to which the caps 18, 18', 22, 22', 24 and 24' are electrically connected in the conventional Wheatstone bridge arrangement. The case is closed by a closure 31 carrying a flange 33 which seats on flange 32 in case 27 and secured by bolts 34. A pressure-tight seal is made by O-ring 35 set in groove 36. A central bore 37 is provided in closure 31.

It will be observed that the initial strain of the wires is solely dependent on the weight 13, as is the sum of the strains in the wires of each pair during any deflection of the force summing means. Thus, for example, when the tension in the wires is all initially equal, each of the wires of each pair bears one-quarter of the weight, and thus the initial strain in each of the wires may be, by a proper choice of the weight, equal to one-half of the design limit of strain to be imposed on the wires. In like manner, the tensions in the wires 25 and 26, as well as in the pair of wires 25' and 26' may be adjusted to be unequal by adjustment of the screw 9'. It will be seen that as the stem 20 moves towards the weight to reduce the strain in the wires 26 and 26' the strain is transmitted to the other wires 25 and 25'. It will also be seen that only the total of the original strain in wires 26 and 26' can be transmitted to wires 25 and 25' since then the wires 26 and 26' go slack. Since the weight 13 is supported entirely on wires 25 and 25', which thus each carry one-half of the weight, the strain in wires 25 and 25' cannot exceed the safe limit chosen and imposed by the weight. The reverse condition occurs when the stem 20 moves away from the weight, as when the gauge acts as a vacuum gauge and the wires 26 and 26' are further stressed while the stress in wires 25 and 25' is relaxed.

Additionally, by properly spacing the bottom of the weight 13 from the base 3, the weight may be made to touch bottom when the total strain in wire 25 has reached the chosen design limit, which may be as desired the ultimate tensile stress or the stress at the proportionality limit of wire 25.

The reduction in tensile stress in one pair of the wires is equalled by the increase in stress in the other two wires, since the total stress in all four of the wires must at all times be equal to the gravitational pull of the weight.

The output of such a transducer is thus 100%, as will be understood from the foregoing discussion.

Where the device is to remain stationary, as for example where it is to be positioned in a fixed vertical position, the weight 13 may be omitted.

Where the device is to be used as a pressure transducer, for example, to measure barometric pressure, the rod may be connected to a diaphragm and the bore 37 exposed to atmospheric pressure, while the case 27 may be either evacuated or subjected to ambient pressure, if a different pressure is to be supplied to bore 37. By fixing the device vertically, the device will act as a pressure gauge. Where the pressure changes, as in the case of a barometer, with low frequency, the changes in pressure will cause but an insignificant rate of change in the stress in the wire and an insignificant acceleration of the mass, and thus the net stress will be substantially equal to that of the mass when at rest.

While I have described a particular embodiment of my invention for the purpose of illustration, it should be understood that various modifications and adaptations thereof may be made within the spirit of the invention as set forth in the appended claims.

I claim:

1. An electrical resistance strain wire transducer comprising: a movable force summing means, a first wire support, a motion transmitting connection between said force summing means and said wire support, a second wire support, a third wire support, a yieldable constraining means comprising a weight connected to said third wire support, a pair of electrical resistance strain wires, one of the wires of said pair connected to and extending in tension between the first and third wire supports and the second strain wire of said pair connected to and extending in tension between the second and third support, and means for displacing the first support relative to the second support on movement of said force summing means, whereby one of said wires increases in tension while the other of said wires decreases in tension on said displacement of said force summing means.

2. A transducer according to claim 1 wherein the wires of said pair are equally tensioned by said weight with tension in each wire of said pair being less than one-half of the ultimate tensile stress.

3. A transducer according to claim 1 in which the wires of said pair are unequally tensioned by said weight, the sum of the tensions in said wires being less than the ultimate tensile stress in the wires.

4. An electrical resistance strain wire transducer comprising: a movable force summing means, a first wire support, a motion transmitting connection between said force summing means and said first support, a second wire support, a third support, a yieldable constraining means comprising a weight connected to said second support, a pair of electrical strain wires extending in tension between the first and second support, a second pair of wires extending in tension between the second and third support, means for displacing the first support relative to the third support, whereby the tension in each of the wires of one of said pairs is increased while the tension in each of the wires in the other pair is decreased on displacement of the force summing means, and electrical connections between said wires adapted to connect said pairs into a Wheatstone bridge.

5. A transducer according to claim 4, wherein the wires are all equally tensioned by said weight at less than one-half of the ultimate tensile stress.

6. A transducer according to claim 4 wherein the wires of each pair are unequally tensioned by said weight, and the wires of each pair whose strain changes in the same direction on movement of the force summing means being in equal tension, and the sum of the tensions in the wires in each pair being less than the ultimate tensile stress.

7. An electrical strain wire transducer, comprising: a movable force summing means, a first wire support, a motion transmitting connection between said force summing means and said first wire support, a frame, a second wire support mounted on said frame, means to hold the second wire support relatively immovable on said frame on motion of said force summing means, a third wire support, a weight connected to said third wire support, a pair of electrical resistance strain wires, one of the wires of said pair connected to and extending in tension between the first and third wire supports and the second strain wire of said pair connected to and extending in tension between the second and third support, and means for displacing the first support relative to the second support on movement of said force summing means, whereby one of said wires increases in tension while the other of said wires decreases in tension on said displacement of said force summing means.

8. A transducer according to claim 7 wherein the wires are all equally tensioned by said weight at less than one-half of the ultimate tensile stress.

9. A transducer according to claim 7 wherein the wires of each pair are unequally tensioned by said weight, and the wires of each pair whose strain changes in the same direction on movement of the force summing means being in equal tension, and the sum of the tensions in the wires in each pair being less than the ultimate tensile stress.

10. An electrical resistance strain wire transducer, comprising: a movable force summing means, a first wire support, a motion transmitting connection between said force summing means and said wire support, a frame, a second wire support, means to hold said second wire support relatively immovable on said frame on motion of said force summing means, a third wire support, a weight connected to said third support, a pair of electrical strain wires extending in tension between the first and third support, a second pair of wires extending in tension between the second and third support, means for displacing the first support relative to the second support, whereby the tension in each of the wires of one of said pairs is increased while the tension in each of the wires in the other pair is decreased on displacement of the force summing means, and electrical connections between said wires adapted to connect said pairs into a Wheatstone bridge.

11. A transducer according to claim 10 wherein the wires are all equally tensioned by said weight at less than one-half of the ultimate tensile stress.

12. A transducer according to claim 10 wherein the wires of each pair are unequally tensioned by said weight, and the wires of each pair whose strain changes in the same direction on movement of the force summing means being in equal tension, and the sum of the tensions in the wires in each pair being less than the ultimate tensile stress.

13. An electric strain wire transducer, comprising: a movable force summing means, a first wire support, a motion transmitting connection connected to said force summing means and to said first wire support, a frame, a second wire support, means for holding said second wire support in adjustably rigid position on said frame, means to adjust the position of said second wire support on said frame, a third wire support, a weight connected to said third wire support, a pair of electrical resistance strain wires, one of the wires of said pair connected to and extending in tension between the first and third wire supports and the second strain wire of said pair connected to and extending in tension between the second and third support, and means for displacing the first support relative to the second support on movement of said force summing means, whereby one of said wires increases in tension while the other of said wires decreases in tension on said displacement of said force summing means.

14. A transducer according to claim 13 wherein the wires are all equally tensioned by said weight at less than one-half of the ultimate tensile stress.

15. A transducer according to claim 13 wherein the wires of each pair are unequally tensioned by said weight and the wires of each pair whose strain changes in the same direction on movement of the force summing means being in equal tension, and the sum of the tensions in the wires in each pair being less than the ultimate tensile stress.

16. An electrical strain wire transducer, comprising: a movable force summing means, a first wire support, a motion transmitting connection connected to said force summing means and to said first wire support, a frame, a second wire support, means for holding said second wire support in adjustably rigid position on said frame, means to adjust the position of said second wire support on said frame, a third wire support, a weight connected to said third support, a pair of electrical strain wires extending in tension between the first and third support, a second pair of wires extending in tension between the second and third support, means for displacing the first support relative to the second support, whereby the tension in each of the wires of one of said pairs is increased while the tension in each of the wires in the other pair is decreased on displacement of the force summing means, and electrical connections between said wires adapted to connect said pairs into a Wheatstone bridge.

17. A transducer according to claim 16, wherein the wires are all equally tensioned by said weight at less than one-half of the ultimate tensile stress.

18. A transducer according to claim 16, wherein the wires of each pair are unequally tensioned by said weight, and the wires of each pair whose strain changes in the same direction on movement of the force summing means being in equal tension, and the sum of the tensions in the wires in each pair being less than the ultimate tensile stress.

No references cited.